US010616326B2

(12) United States Patent
Xu et al.

(10) Patent No.: US 10,616,326 B2
(45) Date of Patent: Apr. 7, 2020

(54) CONTROLLING SHARING OF RESOURCE AMONG A PLURALITY OF NODES

(71) Applicant: EMC Corporation, Hopkinton, MA (US)

(72) Inventors: Sherry Hongru Xu, Shanghai (CN); Brian Tianfang Xiong, Shanghai (CN); Yuanyang Wu, Shanghai (CN); Ning Xu, Shanghai (CN); Yuan Luo, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 585 days.

(21) Appl. No.: 14/968,434

(22) Filed: Dec. 14, 2015

(65) Prior Publication Data
US 2016/0197990 A1    Jul. 7, 2016

(30) Foreign Application Priority Data

Jan. 4, 2015   (CN) .......................... 2015 1 0004780

(51) Int. Cl.
G06F 15/16    (2006.01)
H04L 29/08    (2006.01)
G06F 16/17    (2019.01)
G06F 16/23    (2019.01)

(52) U.S. Cl.
CPC ...... H04L 67/1095 (2013.01); G06F 16/1734 (2019.01); G06F 16/2343 (2019.01)

(58) Field of Classification Search
None
See application file for complete search history.

(56) References Cited

U.S. PATENT DOCUMENTS

| 7,730,258 | B1 * | 6/2010 | Smith | G06F 3/0622 711/114 |
| 8,719,432 | B1 * | 5/2014 | Vermeulen | G06F 9/526 707/704 |
| 8,930,333 | B1 * | 1/2015 | Prince | G06F 17/30171 707/704 |
| 2002/0165929 | A1 * | 11/2002 | McLaughlin | H04L 41/0803 709/213 |
| 2006/0265414 | A1 * | 11/2006 | Loaiza | G06F 16/2343 |
| 2006/0265420 | A1 * | 11/2006 | Macnaughton | G06F 17/30362 |

(Continued)

FOREIGN PATENT DOCUMENTS

| CN | 101291245 A | 10/2008 |
| CN | 101375250 A | 2/2009 |
| CN | 103544189 A | 1/2014 |

Primary Examiner — Phyllis A Book
(74) Attorney, Agent, or Firm — BainwoodHuang

(57) ABSTRACT

Embodiments of the present disclosure relate to a method, a computer program products and apparatus for controlling sharing of a resource among a plurality of nodes, wherein in response to a service using the resource to be initiated at an object node of the plurality of nodes, locking, at the object node, an object file that is associated with use of the resource; in response to successful locking of the object file, determining, at the object node, whether other files associated with the use of the resource at other nodes of the plurality of nodes have been locked; and in response to determining that the other files are not locked, using, at the object node, the resource to initiate the service.

20 Claims, 6 Drawing Sheets

(56) References Cited

U.S. PATENT DOCUMENTS

| | | | |
|---|---|---|---|
| 2011/0179082 A1* | 7/2011 | Vaghani | G06F 17/30008 707/781 |
| 2014/0136502 A1* | 5/2014 | Mohamed | G06F 9/52 707/704 |
| 2015/0120925 A1* | 4/2015 | Das | G06F 16/1774 709/225 |
| 2016/0085920 A1* | 3/2016 | Cyran | G06F 19/322 705/3 |

* cited by examiner

CONTROLLING SHARING OF RESOURCE AMONG A PLURALITY OF NODES

RELATED APPLICATION

This application claim priority from Chinese Patent Application Number CN201510004780.1, filed on Jan. 4, 2015 at the State Intellectual Property Office, China, titled "METHOD AND APPARATUS FOR CONTROLLING SHARING OF RESOURCE AMONG A PLURALITY OF NODES," the contents of which is herein incorporated by reference in entirety.

FIELD OF THE INVENTION

Embodiments of the present disclosure generally relate to the technical field of computers.

BACKGROUND OF THE INVENTION

Generally, in a cluster system comprising a plurality of nodes, a shared service may be provided among the plurality of nodes. As used herein, the term "node" refers to any node that includes, but is not limited to, a server, a personal computer (PC), a laptop computer, a tablet computer, a personal digital assistant (PDA), a mobile phone, and a smart phone, and the like.

Resources used by such a shared service may be usually distributed across a plurality of nodes in the cluster system, and use of the service and the corresponding resources may be usually exclusive to an individual node. For example, at one time, there may only be one node or one process in one node that initiates the service and uses the corresponding resources. As used herein, the term "resource" refers to any resource occupied after the service may be initiated, which includes, but is not limited to, a computing resource, such as a central processing unit (CPU) and the like; a storage resource, such as memory, disk, and the like; an input/output (I/O) resource, such as available capabilities of a graphical processing unit (GPU) and the like; and a network resource, such as network bandwidth and the like In a current cluster system, a conventional approach of controlling the sharing of the resource used by the shared service among a plurality of nodes may be using a dedicated control node to control the sharing. All of the nodes in the cluster may have to interact with the control node if they intend to use the service and the corresponding resource.

For example, when a node, such as node A, in a cluster may intend to initiate a shared service, it may first inquire the control node whether a further node may be currently using the service. If no further node may be using the service, node A may initiate the service. During the period when node A may be using the service, if a further node, such as node B, intends to use the service, node B may also issues an enquiry to the control node. Because node A is using the service, the control node notifies node B that the service is being used, such that node B may not initiate the service. The further node in the cluster may only re-initiate the service until the service ends at node A. When the service ends, node A furthermore has to notify the control node that the service has ended and the corresponding resource may be released. In this way, the control node may notify other nodes in the cluster of the message that the service ends at the node A.

Such an approach of centralized controlling of resource sharing among a plurality of nodes in a cluster by using the control node may require frequent communication interaction between the nodes, which may incur a considerable message overhead. Furthermore, a single-point failure may be prone such an approach. That is, if the control node fails, individual nodes in the cluster may be unable to use the service.

SUMMARY OF THE INVENTION

Example embodiments of the present disclosure provide a method, a computer program product and apparatus for controlling sharing of a resource among a plurality of nodes, wherein in response to a service using a resource to be initiated at an object node of a plurality of nodes, locking, at an object node, an object file that may be associated with use of the resource; in response to successful locking of the object file, determining, at the object node, whether other files associated with the use of the resource at other nodes of the plurality of nodes have been locked; and in response to determining that the other files are not locked, using, at the object node, the resource to initiate the service.

BRIEF DESCRIPTION OF THE ACCOMPANYING DRAWINGS

The above and other features, advantages and aspects of respective embodiments of the present disclosure will become more apparent by making references to the following detailed descriptions in conjunction with the accompanying drawings. In the accompanying drawings, the same or similar references refer to the same or similar elements, in which.

DETAILED DESCRIPTION

Figure 1:
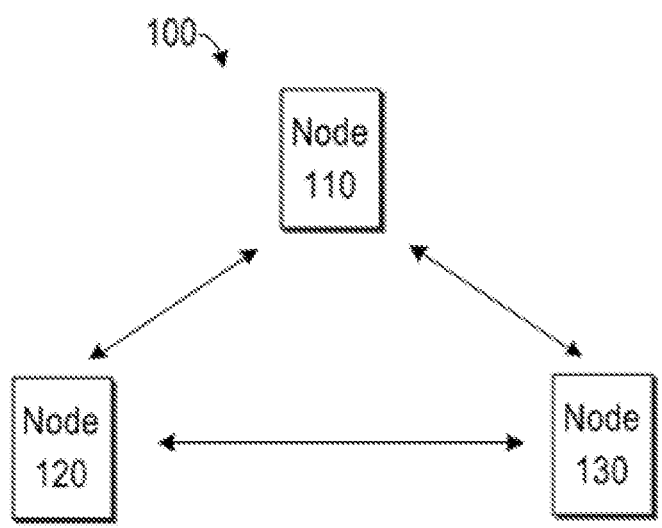
FIG. 1 shows an exemplary cluster system in which embodiments of the present disclosure may be implemented.

Hereinafter, embodiments of the present disclosure will be described in detail with reference to the accompanying drawings. Although some embodiments of the present disclosure have been illustrated in the accompanying drawings, it should be understood that the present disclosure can be implemented in various forms but not construed to be limited by embodiments described here. On the contrary, providing these embodiments is to make the present disclosure understood more thoroughly and completely. It should be understood that the accompanying drawings and embodiments of the present disclosure are merely for illustration without limiting the protection scope of the present disclosure.

The term "comprising" and its variations used here indicate an open inclusion, i.e., "including, but not limited to." The term "based on indicates at least partially based on."

The term "one embodiment" indicates "at least one embodiment;" the term "another embodiment" indicates "at least a further embodiment." Relevant definitions of other terms will be provided in the description below.

Example embodiments of the present disclosure provide a method and apparatus for controlling sharing of a resource among a plurality of nodes, wherein in response to a service using a resource to be initiated at an object node of a plurality of nodes, locking, at an object node, an object file that may be associated with use of the resource; in response to successful locking of the object file, determining, at the object node, whether other files associated with the use of the resource at other nodes of the plurality of nodes have been locked; and in response to determining that the other files are not locked, using, at the object node, the resource to initiate the service.

A further embodiment may include a computer program product. In a further embodiment, a computer program product may be tangibly stored on a non-transient computer readable storage medium and may include a machine-executable instruction which, when being executed, may cause the machine to perform steps of in response to a service using a resource to be initiated at an object node of a plurality of nodes, locking, at an object node, an object file that may be associated with use of the resource; in response to successful locking of the object file, determining, at the object node, whether other files associated with the use of the resource at other nodes of the plurality of nodes have been locked; and in response to determining that the other files are not locked, using, at the object node, the resource to initiate the service A further embodiment may include an apparatus for controlling sharing of a resource among a plurality of nodes. In a further embodiment the apparatus may include a locking unit configured to, in response to a service using the resource to be initiated at an object node of the plurality of nodes, lock, at the object node, an object file that is associated with use of the resource. A further embodiment may include a determining unit configured to, in response to successful locking of the object file, determine, at the object node, whether other files associated with the use of the resource at other nodes of the plurality of nodes have been locked. A further embodiment may include a service initiating unit configured to, in response to determining that the other files are not locked, use, at the object node, the resource to initiate the service.

Reference is first made to FIG. 1, which shows an exemplary cluster system 100 in which embodiments of the present disclosure may be implemented. As shown, generally, system 100 may comprise a plurality of nodes 110, 120 and 130. Nodes 110, 120 and 130 may communicate with each other through a wired or wireless communication link. A service sharable among nodes 110, 120 and 130 may be provided in system 100. The resources used by the service are distributed across nodes 110, 120 and 130. The use of the service by nodes 110, 120 and 130 is exclusive, that is, the service can only be used by one node at one time.

In one embodiment, it should be understood that the number of nodes 110 as shown in FIG. 1 may be only for the purpose of illustration without suggesting any limitation. In a further embodiment, examples of node 110 include, but are not limited to, one or more of the following: a server, a personal computer (PC), a laptop computer, a tablet computer, a personal digital assistant (PDA), a mobile phone, a smart phone, and the like. In a further embodiment, It should be understood that although not shown in FIG. 1, node 110 may comprise: one or more processors or processing units, a memory, and a bus connecting different system components (including a processor or processing unit and a memory).

In a further embodiment, in a conventional approach, sharing of a resource used by the shared service among a plurality of nodes may be controlled in a centralized mode by a dedicated control node (not shown). In a further embodiment, such an approach of the centralized controlling, on one hand, may require frequent communication among the nodes, which may cause a very large message overhead. In a further embodiment, an issue of a single-point failure may easily occur in such an approach.

According to embodiments of the present disclosure, resource sharing may be controlled in a distributed mode among a plurality of nodes, and a specific process thereof will be described in detail for example with reference to FIG. 2. In such a distributed approach, communications may be directly interacting among a plurality of nodes, without a need of an additional node for dedicated controlling.

Figure 2:
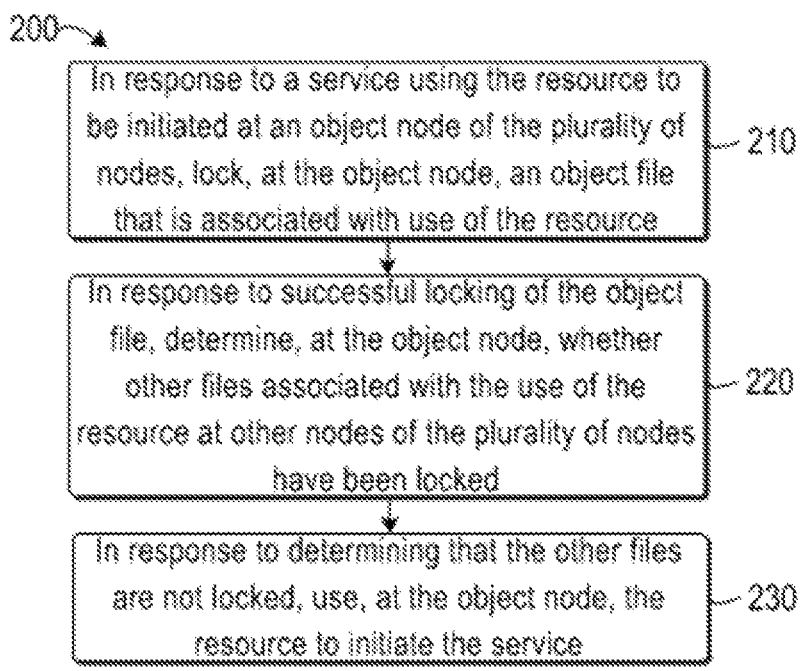
FIG. 2 shows an exemplary flow diagram of a method for controlling sharing of a resource among a plurality of nodes according to one embodiment of the present disclosure.

FIG. 2 shows a flow diagram of method 200 for controlling sharing of a resource among a plurality of nodes according to one embodiment of the present invention. Method 200 may be implemented by nodes 110, 120 and 130 as shown in FIG. 1.

Method 200 starts from step 210, where, in response to a service to be initiated at an object node of a plurality of nodes, an object file associated with the use of the resource used by a service is locked at the object node. Hereinafter, for convenience of description, node 110 as shown in FIG. 1 acts as an object node of the plurality of nodes, and nodes 120 and 130 act as other nodes of the plurality of nodes. After the node 110 in step 210 successfully locks the file that is associated with the use of the resource used by the service to be initiated, the node 110 determines in step 220 whether other files have been locked which are associated with the use of the resource at other nodes 120 and 130 of the plurality of nodes. Next, the method 200 proceeds to step 230, where the node 110 uses the resource to initiate the service in response to determining in step 220 that a further file associated with the use of the resources at a further node is not locked According to embodiments of the present disclosure, a mapping relationship between a resource and a file may be predefined. For example, in one embodiment, a file name and an access path of a file corresponding to the resource used by the service may be predefined. In this example embodiment, when a service is to be initiated by node 110, a file associated with the use of a resource may be locally found based on a mapping relationship between the resource used by a service and a file, such as the file name and the path, and then the file may be locked. In a further embodiment, it should be understood that a mapping relationship between a resource and a file may be predefined in any appropriate way.

According to embodiments of the present disclosure, a mapping relationship between a resource and a file may be stored in a node in any appropriate way that may enable a node to obtain a mapping relationship. For example, in one embodiment, a mapping relationship may be stored in a configuration file. In a further embodiment, accordingly, node 110 may obtain a mapping relationship between a resource and a file by reading a configuration file. In another embodiment, a mapping relationship may be stored in a form of a table, and node 110 may obtain the mapping relationship by looking up a table. In a further embodiment, to prevent a mapping relationship between a resource and a file from being tampered so as to enhance security, the mapping relationship may be stored in a form of a data structure. For example, in a further embodiment, in a data structure of software associated with a service, a corresponding relationship between a resource and a file may be described in the form of a source code.

In one embodiment, for example, a file may be locked in a way where an attribute of the file may be modified. In a further embodiment, an attribute of a file may be modified to be unreadable/unwritten, thereby identifying that a file may have been locked. In an alternate embodiment, a flag bit may also be used to indicate that a file has been locked.

Figure 3:
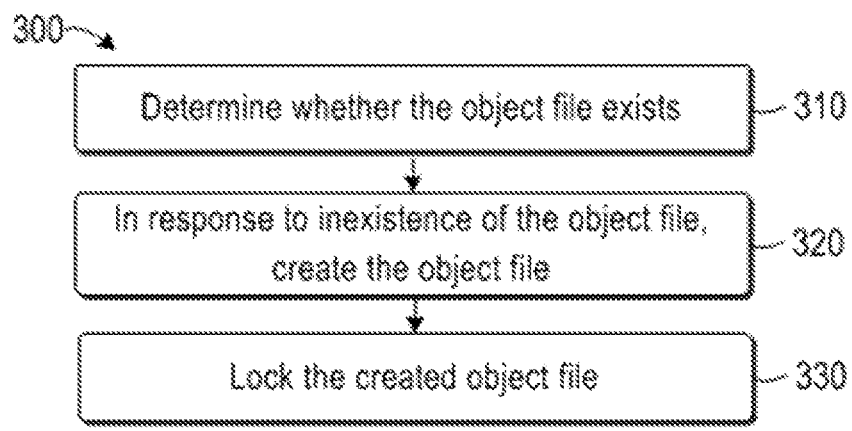
FIG. 3 shows an exemplary flow diagram of a method for locking a file associated with use of a resource according to one embodiment of the present disclosure.

In one embodiment, when node 110 locks a local file, a file corresponding to a resource used by a service to be initiated may not exist at a node for reasons such as mis-operation. FIG. 3 shows a flow diagram of method 300 for locking a file associated with use of a resource in this case according to one embodiment of the present disclosure. As shown, in method 300, node 110 first determines whether the file exists in step 310. If the file does not exist, node 110 creates the file based on the obtained mapping relationship between the resource and the file in step 320 and then locks the created file in step 330. The specific file locking approach is similar to the approach as described above, which will not be detailed here.

Figure 4:
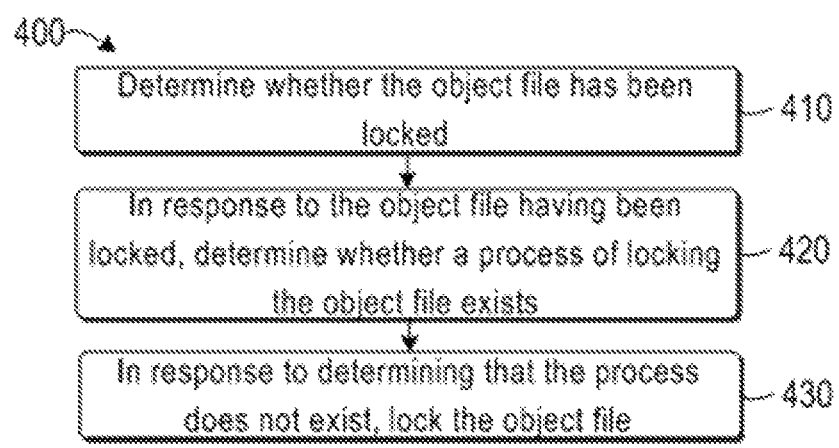
FIG. 4 shows an exemplary flow diagram of a method for locking a file associated with use of a resource according to one embodiment of the present disclosure.

In one embodiment, additionally, before a node re-initiates a service at this time, the node may have used the service. In a further embodiment, in order to prevent a deadlock caused by invalidation of a previous process that uses a service, if a relevant file is determined to have been locked, a step may be performed where it may be determined whether the process locking a file exists. A specific example will be discussed below with reference to FIG. 4. As shown, in method 400, node 110 first determines whether a local file has already been locked in step 410. If it is determined that the file has been locked, then node 110 determines in step 420 whether the process locking the file exists. If the process does not exist, node 110 may determine that the process has been invalid and then, in step 430, perform a file locking operation. If in step 420 it is determined that the process locking the file still exists, node 110 may determine that the service is being used locally and then give up initiation of the service.

Next, still with reference to FIG. 2, after node 110 in step 210 successfully locks the file that is associated with the use of the resource used by the service to be initiated, node 110 determines in step 220 whether other files have been locked which are associated with the use of the resource at other nodes 120 and 130 of the plurality of nodes. According to embodiments of the present disclosure, node 110 may determine by itself whether other files at other nodes 120 and 130 have been locked. In an alternative embodiment, node 110 may also request nodes 120 and 130 to determine whether the corresponding files have been locked.

Specifically, in one embodiment, in step 220, node 110 first attempts to lock a corresponding file at node 120. In an embodiment, for example, after node 110 may have accessed node 120 through a wired or wireless communication link, a process in node 120 may be initiated to attempt to lock a file at node 120 which corresponds to the resource. According to embodiments of the present disclosure, files associated with resources used by a service at respective nodes 110, 120 and 130 may be different files or different instances of a same file, and the scope of the present disclosure is not limited in this regard. In a further embodiment, specific approach of finding a relevant file and locking a file may be similar to the local processing as described above with reference to step 210, which will not be detailed here.

In this example embodiment, if a relevant file at node 120 is successfully locked, then node 110 may determine that a corresponding file at node 120 is not locked. In a further embodiment, next, node 110 may determine whether a corresponding file at node 130 may have been locked according to the same procedure. In a further embodiment, if no corresponding file at a certain node has been locked, then node 110 may determine that the corresponding files at other nodes have not been locked yet, and then it may initiate the service.

In a further embodiment, as long as a file at a further node may not locked, the above determination process of node 110 continues. In a further embodiment, if node 110 determines that a corresponding file at a certain node has been locked, it may be determined therefrom that there may be a further node that may be currently using the service. In a further embodiment, node 110 may stop the above determining process and give up initiation of a service. In a further embodiment, node 110 may not consider whether a corresponding file at a certain node has been locked. In a further embodiment, it may continue the above determination process until the above determination may be performed on all of the other nodes.

In order to prevent a file associated with the use of resource at further node is inappropriately locked, in one embodiment, node 110 immediately releases the locking after successfully locking a corresponding file at node 120. In a further embodiment, node 110 may need to access node 120 again after a service ends or to request node 120 to release the locking of the file.

Alternatively or additionally, in addition to attempting by itself to lock files associated with a use of a resource at other nodes 120 and 130, in another embodiment, node 110 may also request other nodes 120 and 130 to determine whether corresponding files have been locked. For example, in one embodiment, node 110 may inquire nodes 120 and 130 whether corresponding files associated with a use of a resource at the nodes have been locked. In a further embodiment, if a negative acknowledgement is received, node 110 may determine that a corresponding file at the node is not locked. According to embodiments of the present disclosure, a further node in a system may, after receiving the enquiry from node 110, attempt to lock a local file. In a further embodiment, the specific process may be similar to a processing of locking a local file by node 110 as described above with reference to step 210, which will not be detailed here. In a further embodiment, after a further node successfully locks a local file, the further node may immediately release the locking.

Next, method 200 proceeds to step 230, where node 110 uses a resource to initiate a service in response to determining in step 220 that a further file associated with a use of a resources at a further node may not be locked. In a further embodiment, a node to initiate a service may determine whether a further node may be using the service through direct communication with the further node, thereby determining whether to initiate the service accordingly. In a further embodiment, in a conventional approach, a dedicated control node may be needed to control a resource sharing among a plurality of nodes in a centralized mode. According to embodiments of the present disclosure, sharing may be controlled in a distributed mode. In one embodiment, on the one hand, message overheads may be saved. In a further embodiment, on the other hand, occurrence of a single-point failure may be effectively avoided, such that efficiency of controlling a resource sharing is enhanced.

Figure 5:
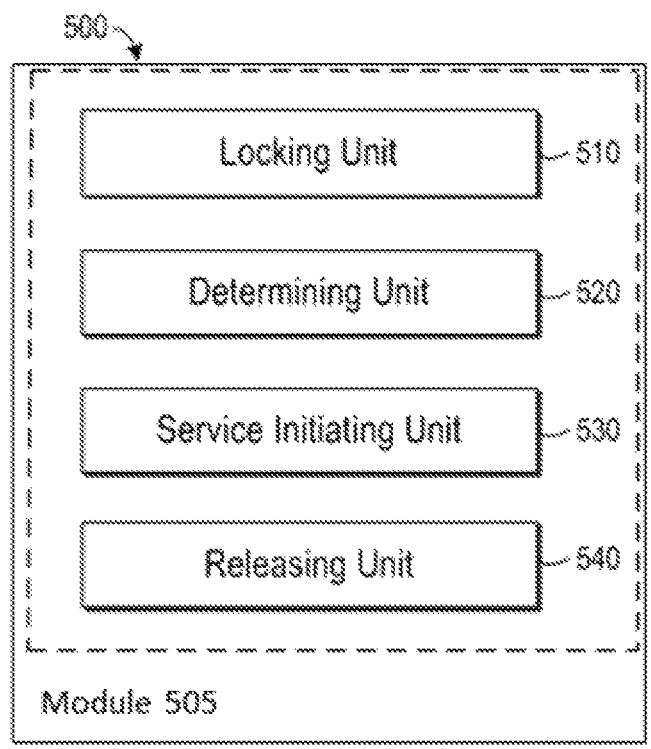
FIG. 5 shows an exemplary block diagram of an apparatus for controlling sharing of a resource among a plurality of nodes according to one embodiment of the present disclosure.

FIG. 5 shows a block diagram of apparatus 500 for controlling sharing of a resource among a plurality of nodes according to one embodiment of the present disclosure. Apparatus 500 may be implemented by nodes 110, 120 and 130 as shown in FIG. 1.

As shown, apparatus 500 comprises locking unit 510 configured to, in response to a service using the resource to be initiated at an object node of a plurality of nodes, lock, at the object node, an object file that is associated with use of the resource; determining unit 520 configured to, in response to successful locking of the object file, determine, at the object node, whether other files associated with use of the resource at other nodes of the plurality of nodes are not locked; and service initiating unit 530 configured to use, at the object node, the resource to initiate the service in response to determining that the other files are not locked. In one embodiment, locking unit 510, determining unit 520 and service initiating unit 530 and other sub-modules may be combined into a single unit, module 505, wherein module 505 may perform the tasks of each of these sub units in an orderly manner to provide the desired results.

In one embodiment, locking unit 510 may comprise: a file determining unit configured to determine whether an object file exists; a file creating unit configured to create an object file in response to inexistence of the object file; and a first locking unit configured to lock the created object file.

In one embodiment, locking unit 510 may comprise: a locking determining unit configured to determine whether an object file has been locked; a process determining unit configured to, in response to an object file having been locked, determine whether the process locking an object file exists; and a first locking unit configured to lock an object file in response to determining that the process does not exist.

In one embodiment, determining unit 520 may comprise: a attempting to lock unit configured to attempt, at an object node, to lock a corresponding file that is associated with a use of a resource at a further node of a plurality of nodes; and a first determining unit configured to, in response to successful locking of a corresponding file, determine whether a corresponding file at a further node of a plurality of nodes is not locked.

In one embodiment, determining unit 520 may further comprise: a locking releasing unit configured to immediately release locking of a corresponding file after successfully locking a corresponding file at a further node of a plurality of nodes.

In one embodiment, determining unit 520 may also comprise: an inquiring unit configured to inquire a further node of a plurality of nodes whether a corresponding file associated with a use of a resource has been locked; and a first determining unit configured to, in response to receiving a negative acknowledgement, determine that a corresponding file at the further node of the plurality of nodes is not locked.

In one embodiment, apparatus 500 may also comprise a releasing unit 540 configured to, in response to end of the service, release locking of an object file at an object node.

It should be noted that for the sake of clarity, FIG. 5 does not show optional units or sub-units included in apparatus 500. It should be understood that all of the features and operations as described above are applicable to apparatus 500, respectively, which will therefore not be detailed here. Moreover, partitioning of units or subunits in apparatus 500 is exemplary, rather than limitative, intended to describe its main functions or operations logically. A function of one unit may be implemented by a plurality of units; on the contrary, a plurality of units may be implemented in one unit. The scope of the present invention is not limited in this regard.

Moreover, units included in apparatus 500 may be implemented in various manners, including software, hardware, firmware or any combination thereof. For example, in some embodiments, the apparatus may be partially or completely implemented using software and/or firmware. Alternatively or additionally, apparatus 500 may be implemented partially or completely based on hardware. For example, one or more units in apparatus 500 may be implemented as an integrated circuit (IC) chip, an application-specific integrated circuit (ASIC), a system on chip (SOC), a field programmable gate array (FPGA), and the like The scope of the present intention is not limited in this regard.

Figure 6:
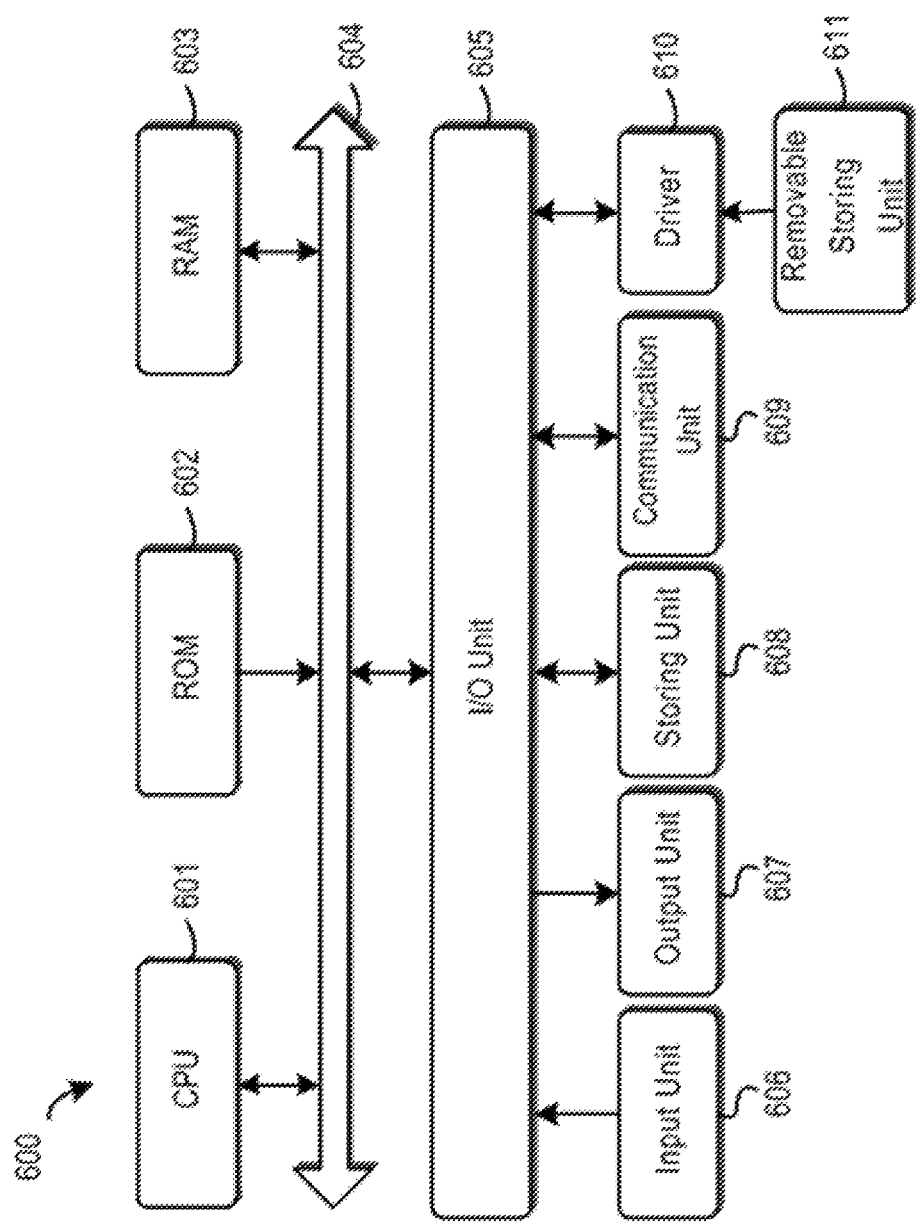
FIG. 6 shows a block diagram of a computer system adapted for implementing an exemplary embodiment of the present disclosure.

The present disclosure may be a device, a method, and/or a computer program product. Reference is made to FIG. 6, which shows a schematic block diagram of computer system 600 adapted for implementing the embodiments of the present invention. As shown in FIG. 6, computer system 600 comprises a central processing unit (CPU) 601 that may perform various suitable actions and processing based on a program stored in read-only memory (ROM) 602 or program loaded from a storage part 608 to random access memory (RAM) 603. RAM 603, there are further stored various programs and data needed for operations of device 600. CPU 601, ROM 602, and RAM 603 are connected to each other via bus 604. Input/output (I/O) interface 605 is also connected to bus 604.

The following components are connected to I/O interface 605: input part 606 including a keyboard, a mouse and the like; output part 607 including a cathode ray tube (CRT), a liquid crystal display (LCD) or the like, a speaker, and the like; storing part 608 including hard disk and the like; and communication part 609 including a network interface card such as a LAN card, a modem and the like. Communication part 609 performs communication processing over a network such as Internet. Driver 610 is also connected to I/O interface 605 as needed. Removable medium 611, such as a disk, an optical disk, a magneto-optical disk, a semiconductor memory, and the like, is mounted on driver 610 as needed such that a computer program read from thereon is installed into storing part 608 as needed.

In particular, according to embodiments of the present disclosure, the process described with reference to FIGS. 1-3 may be implemented as a computer program product that can be tangibly stored on a non-transient computer readable medium and includes a machine executable instruction, causing, when being executed, the machine to implement various aspects of the present disclosure. In such an embodiment, the computer program may be downloaded from the network via communicating part 609 and installed, and/or installed from removable medium 611.

The computer readable storage medium may be a tangible device that may store instructions used by an instruction execution device. The computer readable storage medium may include, but may be not limited to, for example, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other electromagnetic waves freely propagating, electromagnetic waves propagating through a waveguide or other transmission media (such as light pulses passing through a fiber-optic cable), or electrical signals transmitted through a wire.

Computer program instructions for implementing operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, and the like, and conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on the remote computer or server. In the case involving the remote computer, the remote computer may be connected to the user's computer through any type of network, including a local area network (LAN) or a wide area network (WAN), or may be connected to an external computer (for example, through the Internet using an Internet Service Provider). In some embodiments, electronic circuitry, such as programmable logic circuitry, field-programmable gate arrays (FPGA), or programmable logic arrays (PLA), may be customized by utilizing state information of the computer readable program instructions, which may execute the computer readable program instructions in order to perform aspects of the present disclosure.

Aspects of the present disclosure are described herein with reference to flowcharts and/or block diagrams of the device, method, and computer program product according to embodiments of the present disclosure. It will be understood that each block of the flowcharts and/or block diagrams, and combinations of blocks in the flowcharts and/or block diagrams may be implemented by computer readable program instructions.

Various embodiments of the present disclosure have been described above for the purpose of illustration. However, the present disclosure is not intended to limit these embodiments as disclosed. Without departing from the essence of the present disclosure, all modifications and variations fall into the protection scope of the present disclosure defined by the claims.

What is claimed is:

1. A method for controlling sharing of a hardware resource among a plurality of nodes, comprising:
    in response to a service using the hardware resource to be initiated at an object node of the plurality of nodes:
        finding an object file at the object node that is associated with use of the hardware resource based on a mapping relationship between the hardware resource and the object file, and
        locking, at the object node, for the object node, and by the object node itself without interaction between the object node and any other ones of the plurality of nodes, the object file that is associated with use of the hardware resource;
    in response to and subsequent to successful locking of the object file at the object node, determining, by the object node, whether corresponding files at other nodes of the plurality of nodes and associated with the use of the hardware resource at the other nodes of the plurality of nodes have been locked; and
    in response to determining at the object node that the corresponding files are not locked at the other nodes of the plurality of nodes, using, at the object node, the hardware resource to initiate the service.

2. The method according to claim 1, wherein determining, at the object node, whether corresponding files associated with use of the hardware resource at other nodes of the plurality of nodes have been locked comprises:
    attempting, at the object node, to lock a corresponding file associated with the use of the hardware resource at a further node of the plurality of nodes; and
    in response to the successful locking of the corresponding file, determining that the corresponding file at the further node of the plurality of nodes is not locked.

3. The method according to claim 2, further comprising:
    releasing the locking of the corresponding file at the further node immediately upon the successful locking of the corresponding file at the further node of the plurality of nodes.

4. The method according to claim 1, wherein determining, at the object node, whether corresponding files associated with use of the hardware resource at other nodes of the plurality of nodes have been locked comprises:
    inquiring a further node of the plurality of nodes whether the corresponding file associated with the use of the hardware resource at the further node has been locked; and
    in response to receiving a negative acknowledgement, determining that the corresponding file at the further node of the plurality of nodes is not locked.

5. The method according to claim 1, further comprising:
    in response to end the service, releasing, at the object node, the locking of the object file.

6. The method according to claim 1, wherein locking, at the object node, the object file associated with the use of the hardware resource comprises:
    determining whether the object file exists;
    in response to non-existence of the object file, creating the object file; and
    locking the created object file.

7. The method according to claim 1, wherein locking, at the object node, the object file associated with the use of the hardware resource comprises:
    determining whether the object file has been locked;
    in response to the object file having been locked, determining whether a process of locking the object file exists; and
    in response to determining that the process does not exist, locking the object file.

8. An apparatus for controlling sharing of a hardware resource among a plurality of nodes, comprising a module configured to:
    in response to a service using the hardware resource to be initiated at an object node of the plurality of nodes:
        find an object file at the object node that is associated with use of the hardware resource based on a mapping relationship between the hardware resource and the object file, and
        lock, at the object node, for the object node, and by the object node itself without interaction between the object node and any other ones of the plurality of nodes, the object file associated with use of the hardware resource;

in response to and subsequent to successful locking of the object file at the object node, determine, by the object node, whether corresponding files at other nodes of the plurality of nodes and associated with the use of the hardware resource at other nodes of the plurality of nodes have been locked; and in response to determining by the object node that the corresponding files are not locked at the other nodes of the plurality of nodes, use, at the object node, the hardware resource to initiate the service.

9. The apparatus according to claim 8, wherein the module is further configured to:

attempt, at the object node, to lock a corresponding file associated with the use of the hardware resource at a further node of the plurality of nodes; and in response to the successful locking of the corresponding file, determine that the corresponding file at the further node of the plurality of nodes is not locked.

10. The apparatus according to claim 9, the module is further configured to:

release the locking of the corresponding file at the further node immediately upon the successful locking of the corresponding file at the further node of the plurality of nodes.

11. The apparatus according to claim 8, wherein the module is further configured to:

inquire a further node of the plurality of nodes whether the corresponding file associated with the use of the hardware resource at the further node has been locked; and in response to receiving a negative acknowledgement, determine that the corresponding file at the further node of the plurality of nodes is not locked.

12. The apparatus according to claim 8, wherein the module is further configured to:

release, at the object node, the locking of the object file in response to end of the service.

13. The apparatus according to claim 8, wherein the module is further configured to:

determine whether the object file exists;

create the object file in response to inexistence of the object file; and lock the created object file.

14. The apparatus according to claim 8, wherein the module is further configured to:

determine whether the object file has been locked;

in response to the object file having been locked, determine whether a process of locking the object file exists; and lock the object file in response to determining that the process does not exist.

15. A computer program product, the computer program product being tangibly stored on a non-transient computer readable storage medium and including a machine executable instruction that, when being executed, causes the machine to execute steps of a method for controlling sharing of a hardware resource among a plurality of nodes, comprising:

in response to a service using the hardware resource to be initiated at an object node of the plurality of nodes:

finding an object file at the object node that is associated with use of the hardware resource based on a mapping relationship between the hardware resource and the object file, and locking, at the object node, for the object node, and by the object node itself without interaction between the object node and any other ones of the plurality of nodes, the object file that is associated with use of the hardware resource;

in response to and subsequent to successful locking of the object file at the object node, determining, at the object node, whether corresponding files at other nodes of the plurality of nodes and associated with the use of the hardware resource at the other nodes of the plurality of nodes have been locked; and in response to determining by the object node that the corresponding files are not locked at the other nodes of the plurality of nodes, using, at the object node, the hardware resource to initiate the service.

16. The computer program product according to claim 15, wherein determining, at the object node, whether corresponding files associated with use of the hardware resource at other nodes of the plurality of nodes have been locked comprises:

attempting, at the object node, to lock a corresponding file associated with the use of the hardware resource at a further node of the plurality of nodes;

in response to the successful locking of the corresponding file, determining that the corresponding file at the further node of the plurality of nodes is not locked; and releasing the locking of the corresponding file at the further node immediately upon the successful locking of the corresponding file at the further node of the plurality of nodes.

17. The computer program product according to claim 15, wherein determining, at the object node, whether other files associated with use of the hardware resource at other nodes of the plurality of nodes have been locked comprises:

inquiring a further node of the plurality of nodes whether the corresponding file associated with the use of the hardware resource at the further node has been locked; and in response to receiving a negative acknowledgement, determining that the corresponding file at the further node of the plurality of nodes is not locked.

18. The computer program product according to claim 15, further comprising:

in response to end the service, releasing, at the object node, the locking of the object file.

19. The computer program product according to claim 15, wherein locking, at the object node, the object file associated with the use of the hardware resource comprises:

determining whether the object file exists;

in response to non-existence of the object file, creating the object file; and locking the created object file.

20. The computer program product according to claim 15, wherein locking, at the object node, the object file associated with the use of the hardware resource comprises:

determining whether the object file has been locked;

in response to the object file having been locked, determining whether a process of locking the object file exists; and in response to determining that the process does not exist, locking the object file.

* * * * *